Dec. 5, 1950         C. N. ROSWELL         2,533,141
LIQUID HEATING SYSTEM

Filed March 27, 1947         4 Sheets-Sheet 1

Inventor:
Charles Neil Roswell
by Chritton, Schroeder, Merriam & Hofgren
Attorneys.

Dec. 5, 1950      C. N. ROSWELL      2,533,141
LIQUID HEATING SYSTEM

Filed March 27, 1947      4 Sheets-Sheet 3

Inventor:
Charles Neil Roswell
by Oberlin, Scholar, Merriam & Hofgren
Attorneys.

Dec. 5, 1950            C. N. ROSWELL            2,533,141
LIQUID HEATING SYSTEM
Filed March 27, 1947                      4 Sheets-Sheet 4
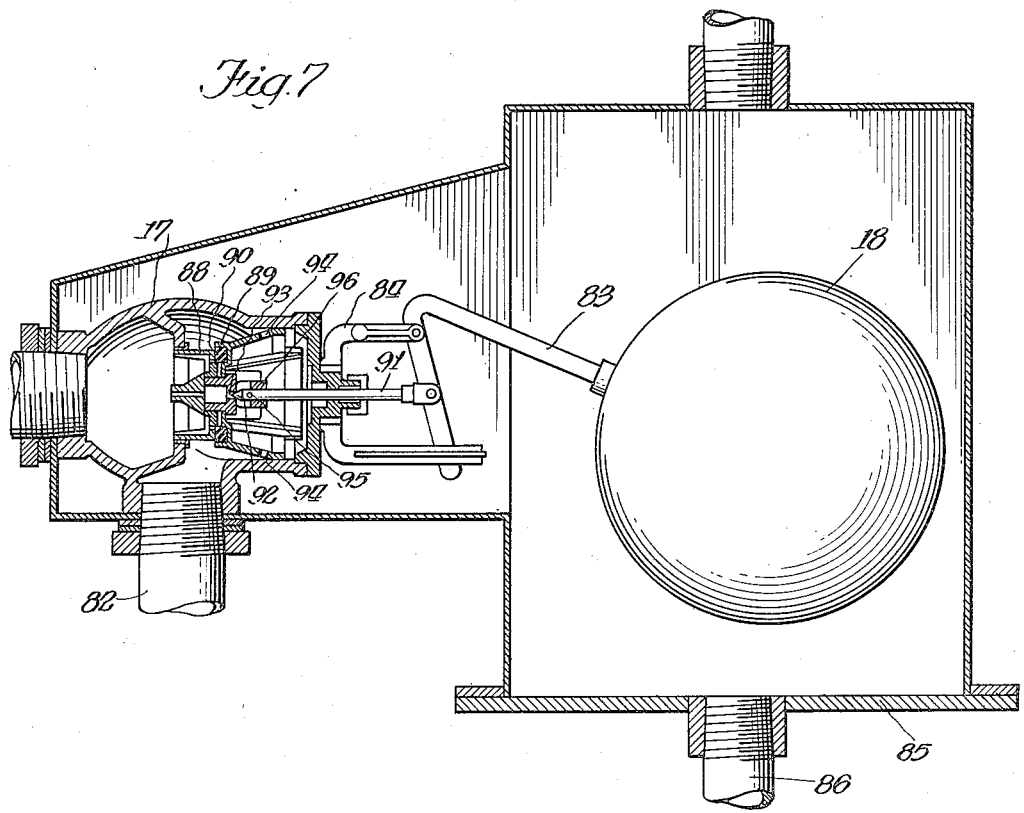
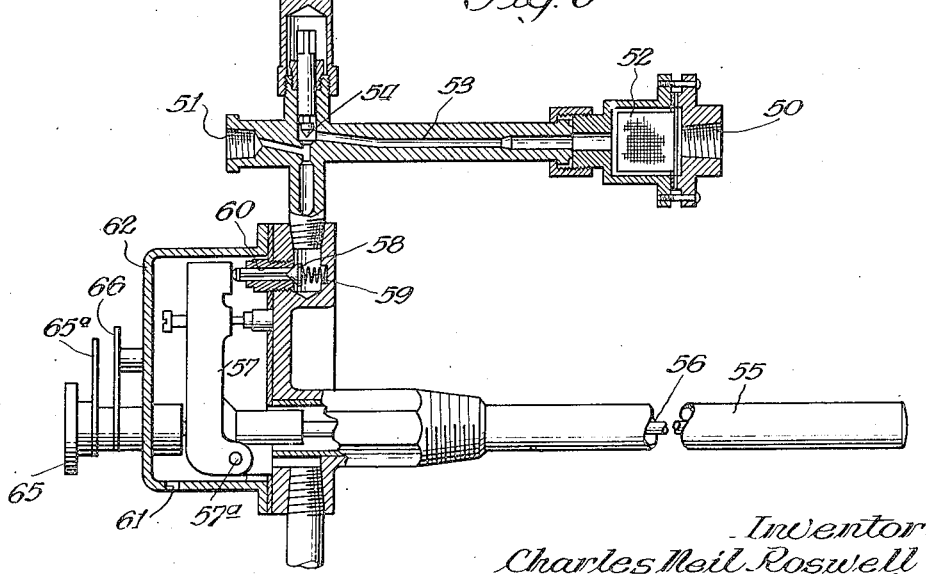
Inventor:
Charles Neil Roswell
by Chitton, Schrader, Merriam & Hofgren
Attorneys.

Patented Dec. 5, 1950

2,533,141

UNITED STATES PATENT OFFICE 2,533,141

LIQUID HEATING SYSTEM

Charles Neil Roswell, Chicago, Ill.

Application March 27, 1947, Serial No. 737,676

12 Claims. (Cl. 257—2)

This invention relates to a heating system for liquids.

It is necessary that many liquids be heated to a particular temperature during processing of the liquids and that overheating or underheating of the liquids be avoided. The liquids are ordinarily heated in a heat exchanger and have usually required constant supervision by one or more operators in order to prevent the temperature of the liquid from getting too high or too low. I have invented a heating system for liquids wherein automatic controls are provided that maintain the temperature of the liquid substantially constant near a predetermined maximum and that provides for improved means for withdrawing steam condensate when steam is used as the heating medium. Means are also provided for supplying steam at a predetermined temperature and under predetermined conditions with the steam supply also being controlled automatically. The principles used in this invention may also be employed in an evaporator for concentrating liquids, which is a particular application of a heating system. Where the invention is used as an evaporator, a condenser is preferably employed to condense the evaporated liquid.

Figure 1:
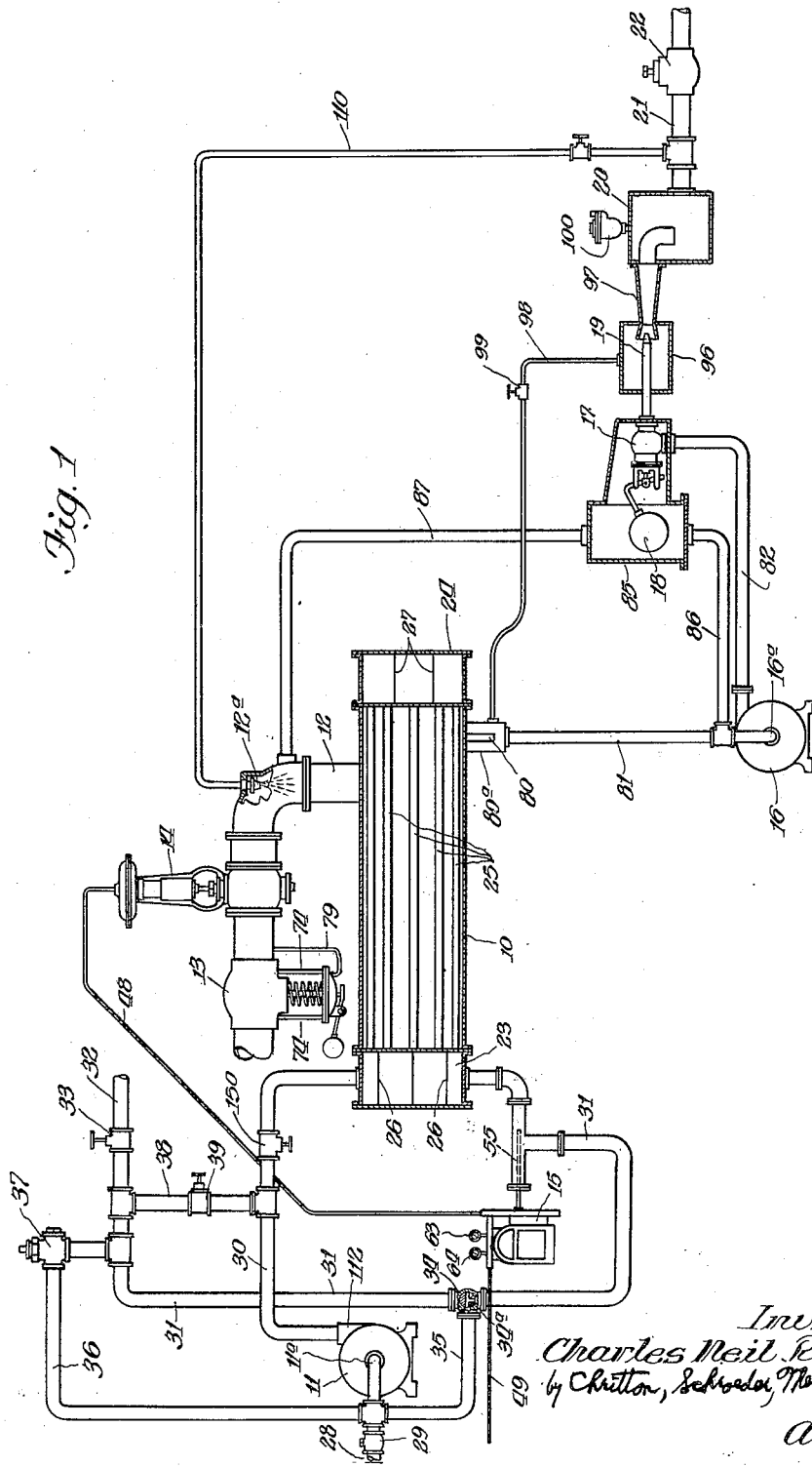
Figure 2:
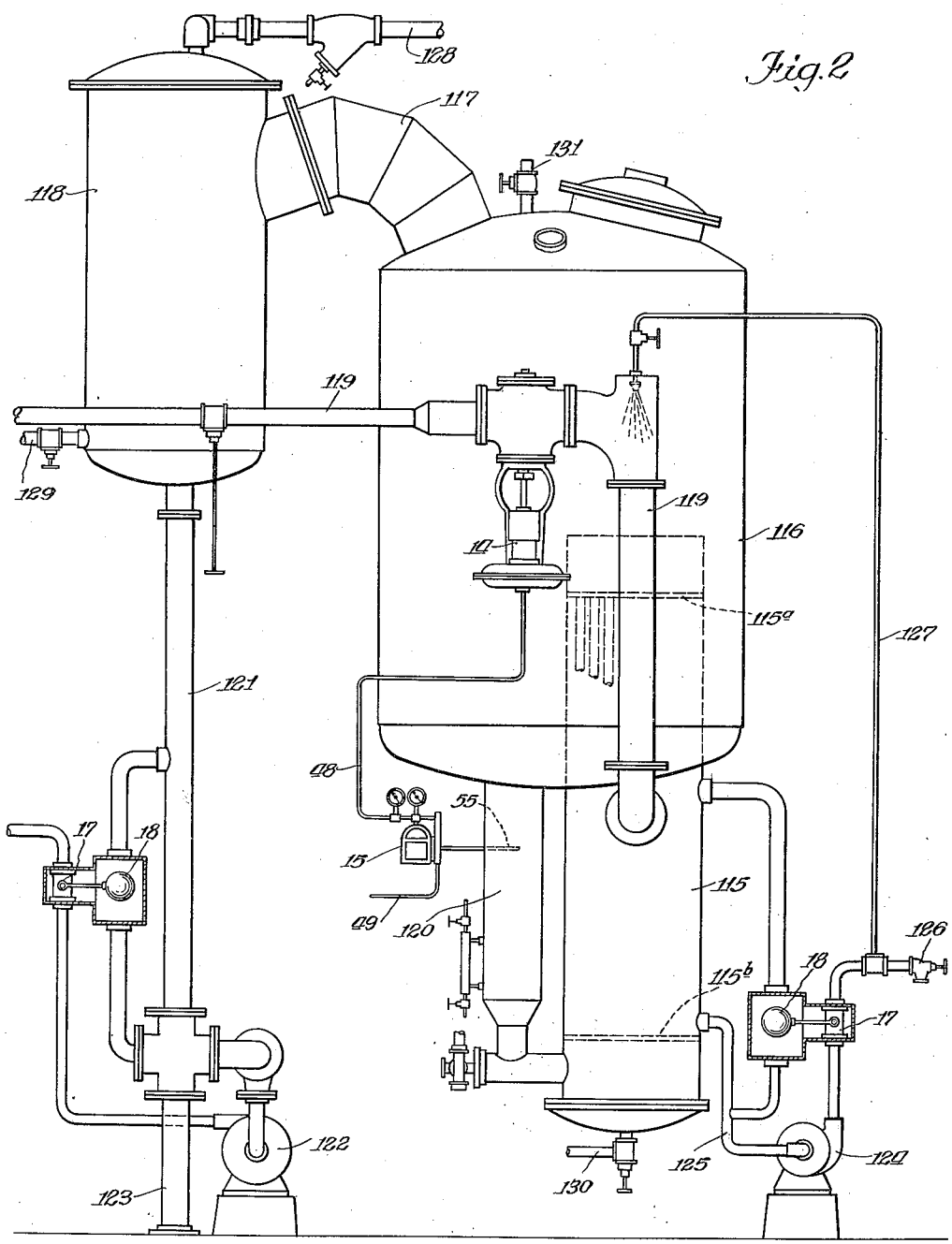
Figure 3:
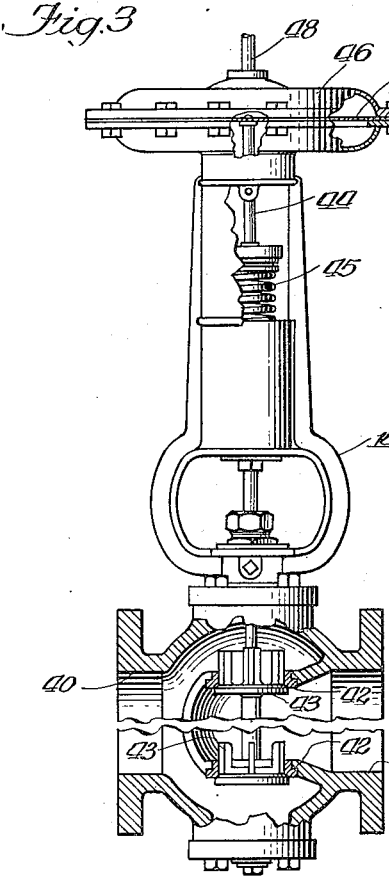
Figure 4:
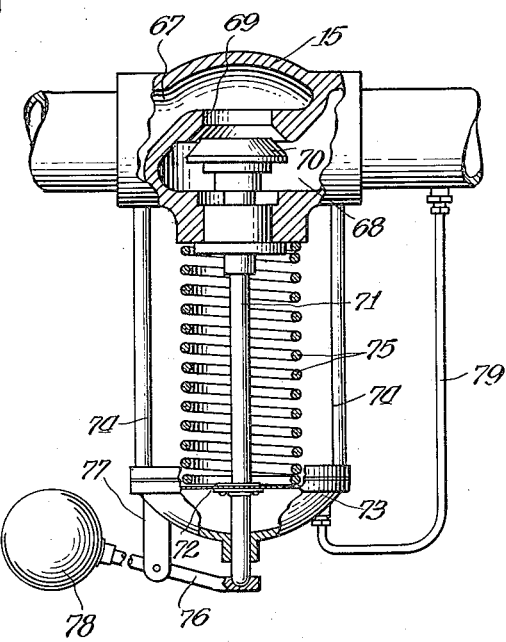
Figure 5:
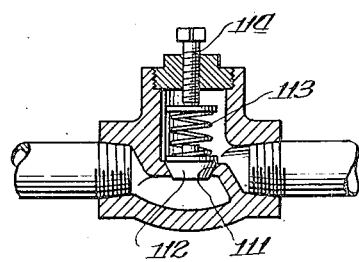
Figure 6:
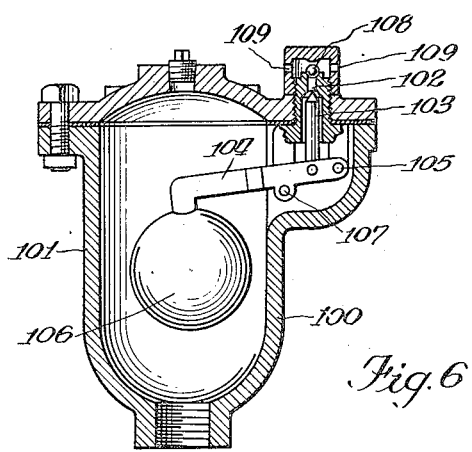

The invention will be described as related to the embodiments shown in the accompanying drawings. Of the drawings, Figure 1 is a semi-diagrammatic view showing a heating system constructed according to the principles of this invention; Fig. 2 is a semi-diagrammatic view illustrating a second embodiment of the invention; Fig. 3 is an elevation, partially in section, of a steam control valve to be used in the steam supply line; Fig. 4 is an elevation, partially in section, of a valve for supplying steam under substantially constant pressure; Fig. 5 is a sectional elevation of a back pressure valve; Fig. 6 is a sectional elevation of a float valve permitting escape of gases; Fig. 7 is a sectional elevation of a float control valve with a float attached thereto; and Fig. 8 is a sectional elevation of a thermostatically controlled valve for controlling the supply of steam.

In the embodiment shown in Fig. 1, there is provided a heat exchanger 10, a centrifugal pump 11 for pumping liquids through the exchanger, a steam supply line 12 to the heat exchanger, a pressure regulating valve 13 in the steam supply line 12 for supplying steam at substantially constant pressure, a steam supply valve 14 in the steam line 12 for regulating the amount of steam, a thermostatically operated temperature control pilot valve 15 for controlling the operation of the valve 14 from the temperature of the heated liquid, a second centrifugal pump 16 adapted to draw off steam condensate, a float valve 17 and a float 18 attached thereto for controlling the head of steam condensate on the pump 16, a Venturi ejector 19 through which the steam condensate is forced, a gas expansion chamber 20 into which the condensate flows from the Venturi ejector 19, a steam condensate line 21 through which the condensate is forced from the expansion chamber 20 and a back pressure creating valve 22 in the steam condensate line 21 designed to open only at a predetermined pressure.

The heat exchanger 10 is provided with a front header 23 and a rear header 24 with parallel pipes 25 extending therebetween. The front header 23 is divided by partitions 26 and the rear header 24 is divided by partitions 27 so that the liquid to be heated will flow back and forth through the pipes 25.

The inlet 11a of the first centrifugal pump 11 is connected to a product inlet 28 through which the liquid to be heated flows. This liquid flows through a check valve 29 that permits flow of liquid only toward the pump 11. The outlet 11b of the pump is connected by a conduit 30 to the heat exchanger 10. The other side of the heat exchanger is connected by a conduit 31 to a product outlet conduit 32 having a manual valve 33 therein. The conduit 31 from the heat exchanger 10 is provided with a 3-way valve 34 having one passage connected to a conduit 35 leading to the inlet 11a of the pump 11. The portion of the conduit 31 beyond the valve 34 is also connected to the pump inlet 11a by a conduit 36 in which is located a back pressure creating valve 37 designed to open only at a predetermined pressure. The inlet conduit 30 to the heater is connected to the outlet conduit 31 from the heater by a by-pass conduit 38 having a manual valve 39 therein that is normally kept closed. With this construction the liquid to be heated may be pumped by the pump 11 through the heat exchanger 10 and out the product outlet conduit 32. In the event that the liquid is to be withdrawn from the heater, the valve 34 may be turned to the position shown in Fig. 1 to empty the heater so that the liquid is circulated through the pump 11, out the line 30, through 38 and out line 32. In this case valve 39 is opened and valve 150 is closed. In normal operation the rotatable portion 34a of the valve 34 may be turned 90 degrees in a counterclockwise direction (Fig. 1) so that the liquid will flow through conduit 31 to the product outlet conduit 32. In this case the valve 39 is closed and valve 150 is opened. If at any time the manual valve 33 is closed, this will create back pressure in the system serving to open valve 37 and cause the liquid to flow back through conduit 36 into the pump inlet 11a and thus be recirculated through the system.

It is preferred that the capacity of the pump be greater than the capacity of the outlet 32 in order that some of the liquid will flow through back pressure valve 37 and be recirculated through the heater. The full capacity of pump 11 is forced through the heater under all operating conditions and a portion of the outlet liquid from the heater is recirculated through the heater. Fresh liquid coming into the pump is thus blended with heated liquid and this reduces extreme temperature fluctuation.

The steam supply to the heat exchanger 10 through the supply line 12 is controlled by the valve 14. The valve 14 (Fig. 3) comprises an inlet port 40, an outlet port 41, a pair of valve seats 42, a pair of valves 43 adapted to engage the valve seats, a rod 44 upon which the valves 43 are mounted, a spring 45 normally maintaining the valves closed, an upper housing 46, and a diaphragm 47 therein operatively connected to the rod 44. The portion of the housing 46 above the diaphragm 47 is connected by a line 48 to the thermostatically operated temperature control pilot valve 15. The valve 15 is operatively connected to a source of fluid under pressure through a line 49. The operating portions of the valve 15 are shown in Fig. 8. These include an inlet 50 arranged to be connected to the line 49 and an outlet 51 arranged to be connected to the line 48 leading to the valve 14. The fluid under pressure flows through a screen 52 and a passageway 53 past a manually adjustable valve 54 which may be adjusted to regulate the supply of fluid. The fluid flows past the valve 54 to the portion of the housing 46 of the valve 14 above the diaphragm 47. While the liquid in the heat exchanger is being heated to the desired temperature, fluid pressure acting through the lines 49 and 48 serve to force the diaphragm down and hold the valves 43 open so that a desired amount of steam will be supplied to the heat exchanger. In order to close the valves 43 when the temperature of the liquid exceeds the predetermined desired temperature, there is provided a thermostatic bulb 55 in the conduit 31 leading from the heat exchanger 10. The temperature of the liquid in this conduit will cause the central portion 56 of the bulb 55 to move to the right by expansion as shown in Fig. 8, and operate a lever 57 mounted for rotation about a fulcrum 57a. This will cause the lever 57 to move in a clockwise direction and open the valve 58 against the urging of the spring 59. As soon as valve 58 is opened, the fluid that is under pressure in passageway 53 will flow around the lever 57 and out the opening 61 in the housing 62 surrounding the lever 57. This relief of the pressure in the passageway 53 will lower the pressure on the diaphragm 47 of the valve 15 and cause the spring 45 to seat the valves 43, thereby closing off the steam supply. When the temperature of the liquid from the heat exchanger falls below a predetermined minimum, the central portion 56 of the bulb 55 will move to the left by contraction thereby closing valve 58 and permitting full fluid pressure to be applied to the diaphragm 47 and open the valves 43. With this arrangement, the liquid leaving the heat exchanger 10 will be maintained at substantially constant temperature and the fluctuating of the temperature will not be over one degree. The indicators 63 and 64 on the thermostatically operated valve structure 15 may be used to show the pressure of the fluid supplied through the lines 49 and 48. This fluid may be either gas or liquid. The thermostatically responsive portion of the valve 15 may be regulated by means of a knob 65 having a pointer 65a thereon adapted to register with a dial 66 to set the temperature of the outgoing liquid. The knob 65 serves to increase or decrease pressure on the lever 57. This system of controlling steam supply by the temperature of the material being heated is old per se and is not claimed specifically herein.

It is preferred that the heat exchanger 10 be operated with steam at relatively low pressure, for example five pounds gauge when the liquid being heated is milk being pasteurized. In order to maintain this low pressure steam, a pressure regulating valve 13 is provided in the steam supply line 12. This valve 13 (Fig. 4) comprises a steam inlet 67, a steam outlet 68, a valve seat 69, and a valve 70 adapted to close on the valve seat 69. The valve 70 is connected to a rod 71 whose other end is connected to a diaphragm 72 located in a housing 73. This housing is held by means of rods 74 or the like spaced from the valve body. A spring 75 is arranged concentrically to the rod 71 with one end of the spring bearing against the diaphragm 72. A lever 76 is fulcrummed on a support 77 that is mounted on the housing 73 with one end of the lever bearing against the free end of the rod 71 and the other end of the lever having a weight 78 attached thereto. The outlet side of the valve structure 13 is connected by means of a line 79 to the housing 73 on the side of the diaphragm 72 opposite the valve 70. The spring 75 and weight 78 are arranged so that the force of the weight 78 acting on the rod 71 will equal the force of the spring 75 plus the desired steam pressure. When the steam pressure to the heat exchanger 10 is at or above the pressure desired, this pressure will be transmitted through the line 79, act on the diaphragm 72, and close the valve 70. When the pressure falls below that desired, the spring 75 will force the diaphragm 72 downward against the force of the weight 78 and open the valve 70 to permit more steam to flow in. This particular steam control is also old per se and is not claimed specifically.

The heat exchanger 10 is provided with a steam condensate port 80 on the bottom of the heat exchanger emptying into a condensate conduit 81. This conduit 81 leads to the intake 16a of the second centrifugal pump 16. In order to maintain a substantially constant head of steam condensate on the pump 16, the outlet of the pump is connected to a conduit 82, which in turn is connected to the float operated valve 17. The float operated valve 17 (Fig. 7) is caused to open and close by means of a float 18 attached thereto. The float 18 is mounted on a lever arm 83 which is fulcrummed on a bracket 84 mounted on the valve 17. The float operates in a float chamber 85. This float chamber has its bottom connected by a conduit 86 to the condensate conduit 81 leading to the pump 16 while the top of the float chamber is connected by a conduit 87 to the steam supply line 12. These conduits 86 and 87 serve to equalize the pressure in the float chamber 85. The level of the condensate flowing from conduit 81 through the conduit 86 into the chamber 85 will be the same as the level of the condensate in the conduit 81. When the float 18 is down, the valve 17 will be closed so that the centrifugal pump 16 will pump no condensate from the heat exchanger 10. When the level of the condensate in the conduit 81 and chamber 85 rises this will cause the float 18 to rise and open valve 17 so that condensate may be pumped through the valve 17. This arrangement serves to maintain a substantially constant head on the pump 16 and this head may be changed or regulated by changing or regulating the height of the float 18 above the pump 16. The valve 17 comprises a valve seat 88 and a valve member 89 having a gasket 90 adapted to be held against the seat 88. The valve member 89 is connected to the lever 83 by means of a rod 91. One end of this rod is attached to the lever 83 while the other end is formed as a valve member 92 adapted to close an opening 93 in the valve member 89. When the float rises, the rod 91 will be pulled away from the valve member 89 causing the opening 93 to open. This permits condensate to flow through the openings 94 in the valve member 89 and through the opening 93. Further movement of the rod 91 causes a pin 95 to engage a portion 96 of the valve member 89 and open the valve completely. With this construction the force needed to open the valve is kept at a minimum.

When the valve 17 is open, condensate is pumped therethrough and through the Venturi ejector 19. The ejector is surrounded by a chamber 96. The Venturi ejector ejects into a relatively large pipe 97 and thus creates a vacuum in the chamber 96. This vacuum may be used to draw off non-condensable gases from above the steam condensate in the conduit 81 by providing a vacuum line 98 extending between the chamber 96 and the portion of the condensate conduit adjacent the port 80. This port 80 is surrounded by a separating chamber 80a in order that the gases will separate. This vacuum line is provided with a manual valve 99 which is ordinarily kept open. Any other source of vacuum may, of course, be used to remove the non-condensable gases, and in this case the Venturi ejector 19 will not be needed.

The pipe 97 exhausts into an expansion chamber 20 and carries the non-condensable gases with it. These gases are permitted to escape through an exit valve 100 at the top of the expansion chamber 20. This exit valve (Fig. 6) comprises a condensate receiving chamber 101 having opening 102 in the top thereof. This opening is arranged to be closed by a valve member 103 rotatably attached to a lever 104 that is mounted for rotation about a fulcrum 105. The other end of the lever 104 has attached thereto a float 106. The lever is prevented from turning too far in a counterclockwise direction by means of stop member 107. As the opening 102 is normally open, the non-condensable gases above the condensate in the chamber 20 may escape therethrough. If the condensate level rises in the chamber 101 to a point where there is danger of the condensate escaping the float 106 will raise the lever 104 and cause the valve member 103 to close the opening 102. Thus, escape of condensate is prevented. The gases flowing through the opening 102 raise a ball check valve 108 and flow out side openings 109. If there is vacuum within the chambers 20 and 101, the ball check valve 108 will prevent air from being drawn into the system. The expansion chamber 20 and exit valve 100 are not needed if the non-condensable gases are removed by a separate source of vacuum.

From the expansion chamber 20, the condensate flows through the conduit 21 and through the back pressure valve 22. This conduit 21 is provided with a condensate lead line 110 leading to the steam supply line 12. The condensate enters the line 12 through a spray nozzle 12a. The condensate is caused to flow through this line by the back pressure of the valve 22 and serves to desuperheat the steam and to introduce condensate recirculation to maintain a desired flow through the Venturi ejector 19 and create a constant vacuum to draw off non-condensable gases. The valve 22, which is shown in Fig. 5, comprises a valve seat 111, a valve member 112 and a spring 113 adapted to hold the member in closed position. This serves to create a predetermined pressure within the conduit 21. The pressure may be varied by varying the compression on the spring 113 through the screw 114. The back pressure valve 37 in the liquid line 36 is similar to valve 22 except that as shown it is a right angled valve.

With the heating system just described, the liquid being heated is maintained at a constant temperature at all times without requiring the constant supervision of an operator. Means are provided for recirculating the liquid through the heat exchanger until it reaches the desired temperature. The entire system operates automatically and overheating of the liquid is prevented.

The invention as applied to an evaporator is shown in Fig. 2. In this embodiment, there is provided a heat exchanger 115 mounted vertically and having one end extending into an evaporating chamber 116. The gases evolved in evaporation are conducted through a conduit 117 to a condenser 118. Steam is applied to the heat exchanger 115 by means of a steam line 119. Liquid being evaporated is circulated through the heat exchanger 115 by means of a conduit 120 leading from the bottom of the evaporation chamber 116 to the bottom of the heat exchanger 115. The heat exchanger 115 is similar to that shown in Fig. 1 and has an upper header 115a and a lower header 115b. The steam supply in the line 119 is controlled by means of a steam supply valve 14 (Fig. 3) operated by a thermostatically operated temperature control pilot valve 15 (Fig. 8) through fluid lines 48 and 49. The liquid condensate is withdrawn from the condenser 118 through a condensate line 121 leading to a condensate pump 122. This condensate line is supported on a post 123. A constant head of condensate is maintained on the pump 122 by means of a float operated valve 17 and a float 18 (Fig. 7). This valve and its operation have been previously described.

Steam condensate from the heat exchanger 115 is withdrawn through a second centrifugal pump 124 through a line 125. The condensate head is also controlled by a second valve 17 operated by a float 18 (Fig. 7) with the operation of this valve the same as that previously described. The condensate is exhausted through a back pressure valve 126 and a portion of the condensate may be used to desuperheat the steam causing it to flow through a line 127 into the steam supply line 119. The valve 126 may be either manually operated as shown, with the condensate being forced into the steam supply line when the valve is closed, or may be a back pressure creating valve such as is shown in Fig. 5.

Water or other cooling liquid flows into the condenser 118 through the line 128 and out of the condenser through the line 129. The steam supply through the line 119 should be low pressure steam. If the normal steam supply is high pressure steam, a control valve such as that shown in Fig. 4 may be used in the line 119.

In the operation of the evaporator shown in Fig. 2, the liquid level is normally maintained above the top of the heat exchanger 115. Heating of the liquid in the heat exchanger causes circulation of the liquid. As soon as sufficient liquid has been evaporated, the material may be withdrawn through the product outlet line 130 and the evaporator may be refilled with additional liquid through the inlet line 131.

Having described my invention as related to the embodiments shown in the accompanying drawings, it is my intention that the invention be not limited by any of the details of description unless otherwise specified, but rather be construed broadly wihin its spirit and scope as set out in the accompanying claims.

I claim:

1. A heating system for liquids, comprising: a heat exchanger including passages through which the liquid flows and a heating zone therearound; means for moving the liquid through the heat exchanger including a pump, conduit means leading from the discharge of the pump to the heat exchanger, discharge conduit means leading from the heat exchanger to a discharge outlet, conduit means leading from the discharge conduit to the intake of the pump, a valve means in said last named conduit means arranged to open automatically at a predetermined pressure; means for supplying steam to the heating zone; means communicating with the discharge conduit and operated by the temperature of the discharge for regulating the amount of steam in inverse ratio; means for withdrawing steam condensate from the heat exchanger including a centrifugal pump below the heat exchanger; means including a valve for regulating the amount of discharge of the centrifugal pump; means controlled by the condensate head on the pump for regulating said valve to provide a substantially constant condensate head on said pump; means for removing substantially all the uncondensible gases from said condensate; and means for returning at least a portion of the condensate to the steam supply for the heat exchanger.

2. The heating system of claim 1 wherein the steam supply means includes a steam pipe communicating with said heating zone and the regulating means includes a valve in said steam pipe normally open, a diaphragm connected to said valve for closing same when fluid pressure is applied to said diaphragm, a fluid line communicating with said diaphragm to close said valve, and a temperature-responsive valve in said fluid line having a temperature-responsive portion communicating with the liquid discharge from the heat exchanger, said temperature responsive valve serving to close said fluid valve when the temperature of the discharge goes above a predetermined temperature and to open the fluid valve when the discharge temperature falls below a predetermined temperature.

3. The heating means of claim 1 wherein the condensate withdrawing means and condensate regulating means comprises a float chamber at a level between the condensate pump and the heat exchanger, a float therein operatively connected to said condensate valve serving to open said valve when the float rises and close said valve when the float falls, a conduit means communicating with the float chamber at a point above the highest level of the float and with the heat exchanger, and a conduit means communicating with the float chamber at a point below the lowest level of the float and with the intake side of the condensate pump at a point below the lowest level of the condensate.

4. The heating system of claim 1 wherein the means for removing the uncondensible gases from the condensate comprises a vacuum-creating means and a conduit means having one end communicating therewith and the other end communicating with the condensate removal system on the intake side of the condensate pump.

5. The heating system of claim 1 wherein the means for removing the uncondensible gases from the condensate comprises a Venturi ejector through which the condensate is forced and a conduit means having one end communicating therewith and the other end communicating with the condensate removal system on the intake side of the condensate pump.

6. The heating system of claim 1 wherein the means for removing the uncondensible gases from the condensate comprises a Venturi ejector through which the condensate is forced, an expansion chamber into which the condensate is pumped, an opening therein for permitting the escape of said gases; a valve therein, and means operated by the level of condensate in the chamber to close said valve when the condensate level rises above a predetermined point.

7. The heating system of claim 1 wherein the means for returning the condensate comprises a discharge line, a valve therein arranged to open at a predetermined pressure, and a conduit means communicating with said line on the intake side of said valve and with said steam supply means.

8. A heating system for liquids, comprising: a heat exchanger including passages through which the liquid flows and a heating zone therearound; means for moving the liquid through the heat exchanger including a pump, conduit means leading from the discharge of the pump to the heat exchanger, discharge conduit means leading from the heat exchanger to a discharge outlet, conduit means leading from the discharge conduit to the intake of the pump, a valve means in said last named conduit means arranged to open automatically at a predetermined pressure; means for supplying heat to the heating zone including a steam pipe communicating with said zone; means for regulating the steam supply including a valve in said steam pipe normally open, a diaphragm connected to said valve for closing same when fluid pressure is applied to said diaphragm, a fluid line communicating with said diaphragm to close said valve, and a temperature-responsive valve in said fluid line having a temperature-responsive portion communicating with the liquid discharge from the heat exchanger, said temperature-responsive valve serving to close said fluid valve when the temperature of the discharge goes above a predetermined temperature and to open the fluid valve when the discharge temperature falls below a predetermined temperature; means for withdrawing steam condensate from the heat exchanger and for regulating said amount including a centrifugal pump below the heat exchanger and a condensate valve for regulating the discharge of said centrifugal pump, a float chamber at a level between the condensate pump and the heat exchanger, a float therein operatively connected to said condensate valve serving to open said valve when the float rises and close said valve when the float falls, a conduit means communicating with the float chamber at a point above the highest level of the float and with the heat exchanger, a conduit means communicating with the float chamber at a point below the lowest level of the float and with the intake side of the condensate pump at a point below the lowest level of the condensate; means for removing the uncondensible gases from the condensate including a Venturi chamber through which the condensate is forced, an expansion chamber into which the condensate is pumped, an opening therein for permitting the escape of said gases, a valve therein, means operated by the level of condensate in the chamber to close said valve when the condensate level rises above a predetermined point; a discharge line from the expansion chamber; and means for returning at least a portion of the condensate to the steam supply means including a valve in said discharge line arranged to open at a predetermined pressure, and a conduit means communicating with said line on the intake side of said valve and with said steam supply means.

9. The heating system of claim 1 wherein there are provided a by-pass conduit from the outlet conduit to the intake side of the pump, and a valve in said by-pass conduit.

10. The heating system of claim 1 wherein there is provided a cold liquid conduit from the pump outlet conduit to the outlet conduit from the heating zone on the intake side of said heating zone outlet valve, and a normally closed valve therein.

11. In a heating system for liquid wherein the liquid is heated by passing it through a heating zone, means for preventing over-heating of the liquid comprising a pump, an intake conduit to said pump, an outlet conduit from the pump to the intake of the heating zone, an outlet conduit from the outlet of the heating zone to a point of discharge, a valve therein, a re-circulating conduit from the outlet conduit on the intake side of said valve to the intake of said pump, a relief valve therein arranged to open at a predetermined pressure, a check valve in said pump intake conduit beyond the re-circulating conduit permitting flow only toward the pump, a by-pass conduit from the outlet conduit to the intake side of the pump, a valve in said by-pass conduit, and a cold liquid conduit from the pump outlet conduit to the outlet conduit from the heating zone on the intake side of said heating zone outlet valve and a normally closed valve therein.

12. In a heating system for liquids wherein the liquid is heated by passing it through a heating zone, means for preventing overheating of the liquid comprising a pump for the liquid to be heated, an intake conduit to said pump, an outlet conduit from the pump to the intake of the liquid heating zone, an outlet conduit from the outlet of the liquid heating zone to a point of discharge, a valve in said heating zone outlet conduit, a re-circulating conduit for said liquid from the outlet conduit on the intake side of said valve to the intake of said pump, a restrictive valve in the re-circulating conduit arranged to provide a predetermined pressure in the re-circulating conduit on the inlet side of said restrictive valve, a by-pass conduit between the outlet conduit from the heating zone and the intake of said pump, a valve in said by-pass conduit, a cold liquid conduit between the pump outlet conduit and the outlet conduit from the heating zone on the intake side of said heating zone outlet valve, and a normally closed valve in said cold liquid conduit.

CHARLES NEIL ROSWELL.

REFERENCES CITED

The following references are of record in the file of this patent:

UNITED STATES PATENTS

| Number | Name | Date |
|---|---|---|
| 1,414,780 | Giesler | May 2, 1922 |
| 1,791,756 | Fay | Feb. 10, 1931 |
| 1,884,231 | Reeder | Oct. 25, 1932 |
| 1,977,738 | Olson | Oct. 23, 1934 |
| 2,169,555 | Carruthers | Aug. 15, 1939 |
| 2,303,063 | Peebles et al. | Nov. 24, 1942 |
| 2,359,041 | Keenan et al. | Sept. 26, 1944 |
| 2,378,350 | Worthen et al. | June 12, 1945 |

FOREIGN PATENTS

| Number | Country | Date |
|---|---|---|
| 417,029 | Great Britain | Sept. 26, 1934 |